(12) United States Patent
Cho et al.

(10) Patent No.: US 10,536,201 B2
(45) Date of Patent: Jan. 14, 2020

(54) COORDINATED TRANSMISSION METHOD BASED ON BEAM DIVISION MULTIPLE ACCESS AND APPARATUS PERFORMING THE SAME

(71) Applicant: Korea Advanced Institute of Science and Technology, Daejeon (KR)

(72) Inventors: Dong Ho Cho, Daejeon (KR); Byung Chang Chung, Daejeon (KR); Dae Hee Park, Daejeon (KR); Joon Sang Han, Daejeon (KR); Yun Sik Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 82 days.

(21) Appl. No.: 15/526,623

(22) PCT Filed: Feb. 22, 2016

(86) PCT No.: PCT/KR2016/001723
§ 371 (c)(1),
(2) Date: May 12, 2017

(87) PCT Pub. No.: WO2017/146275
PCT Pub. Date: Aug. 31, 2017

(65) Prior Publication Data
US 2018/0062721 A1 Mar. 1, 2018

(30) Foreign Application Priority Data
Feb. 22, 2016 (KR) .................. 10-2016-0020581

(51) Int. Cl.
*H04W 72/08* (2009.01)
*H04B 7/0413* (2017.01)
*H04B 7/06* (2006.01)

(52) U.S. Cl.
CPC ......... *H04B 7/0617* (2013.01); *H04B 7/0695* (2013.01); *H04W 72/082* (2013.01); *H04B 7/0413* (2013.01)

(58) Field of Classification Search
USPC ........................................ 370/329
See application file for complete search history.

(56) References Cited

U.S. PATENT DOCUMENTS 8,280,444 B1 10/2012 Shen et al.
2004/0116146 A1* 6/2004 Sadowsky .............. H04B 7/022
455/525

(Continued)

FOREIGN PATENT DOCUMENTS

KR 10-2010-0116555 A 11/2010
KR 10-2011-0044302 A 4/2011
KR 10-2012-0034902 A 4/2012

OTHER PUBLICATIONS

International Search Report for PCT/KR2016/001723 dated Nov. 9, 2016 from Korean Intellectual Property Office.

*Primary Examiner* — Angel T Brockman
(74) *Attorney, Agent, or Firm* — Paratus Law Group, PLLC

(57) ABSTRACT

A coordinated transmission method based on beam division multiple access and an apparatus performing the same are disclosed. The coordinated transmission method in a beam division multiple access environment, which divides a service target region into a plurality of beam sectors through a plurality of antenna arrays having at least one of a pattern characteristic and a polarization characteristic, includes receiving a coordination request from a user terminal located in the service target region and performing any one among a macro diversity operation, a coordinated silence operation, (Continued)

and a coordinated beamforming operation for the user terminal based on an interference level included in the coordination request.

18 Claims, 8 Drawing Sheets

(56) References Cited

U.S. PATENT DOCUMENTS

| | | | |
|---|---|---|---|
| 2005/0180312 A1* | 8/2005 | Walton | H04B 7/0408 370/208 |
| 2005/0265275 A1* | 12/2005 | Howard | H04B 7/0417 370/328 |
| 2010/0202308 A1 | 8/2010 | Gorokhov et al. | |
| 2011/0142164 A1 | 6/2011 | Wu et al. | |
| 2012/0082149 A1 | 4/2012 | Kim et al. | |
| 2012/0083282 A1 | 4/2012 | Choi et al. | |
| 2013/0208587 A1* | 8/2013 | Bala | H04W 16/14 370/230 |
| 2015/0111592 A1* | 4/2015 | Chang | H04W 16/10 455/452.1 |

* cited by examiner

COORDINATED TRANSMISSION METHOD BASED ON BEAM DIVISION MULTIPLE ACCESS AND APPARATUS PERFORMING THE SAME

CROSS REFERENCE TO PRIOR APPLICATIONS

This application is a National Stage Patent Application of PCT International Patent Application No. PCT/KR2016/001723 (filed on Feb. 22, 2016) under 35 U.S.C. § 371, which claims priority to Korean Patent Application No. 10-2016-0020581 (filed on Feb. 22, 2016), which are all hereby incorporated by reference in their entirety.

TECHNICAL FIELD

The following description relates to a coordinated transmission method based on beam division multiple access, and an apparatus performing the same.

BACKGROUND ART

In a multiple input multiple output (MIMO) wireless communication system, a diversity gain or a multiplexing gain is obtained by arranging a plurality of antennas having the same characteristic at an interval which is equal to or more than half a wavelength of a carrier frequency. The reason for arranging the plurality of antennas at an interval which is equal to or more half the wavelength is that the diversity gain or the multiplexing gain is decreased since channel characteristics become similar due to pattern similarity between the antennas by the plurality of antennas having the same characteristic being arranged at an interval which is within half the wavelength.

In MIMO technology, the number of antennas is not great, such as 2×2, 4×4, 8×8, etc., but in massive MIMO technology, which is next generation communication technology, the number of antennas is remarkably increased, such as 32, 64, 128, etc. In this case, a space occupied by the antennas may be a problem due to using a plurality of antennas. For this, using antennas utilizing a pattern/polarization characteristic has been proposed.

Since a radiation pattern characteristic of an antenna shows a difference according to a structure of the antenna, an antenna utilizing the pattern/polarization characteristic can increase an integration rate per unit of space when compared to a conventional antenna. Further, a characteristic in which a channel gain is isolated due to an intrinsic characteristic of an antenna using the pattern/polarization characteristic has been shown.

In a conventional coordinated multi-point (CoMP) transmission and reception system, base station coordination methods such as micro diversity, coordinated silence, coordinated beamforming, etc. have been proposed, and such base station coordination methods consider an environment in which a beam is not introduced, or do not consider a case of using antennas using the pattern/polarization characteristic even when considering a beam.

A base station coordination method is needed in a beam division multiple access environment using antennas using the pattern/polarization characteristic.

DISCLOSURE

Technical Problem

Embodiments provide technology which mitigates interference through coordinated transmission with a terminal located at a cell boundary in a beam division multiple access environment and provides a stable service.

Technical Solution

Embodiments provide technology which mitigates interference through coordinated transmission with a terminal located at a cell boundary in a beam division multiple access environment and provides a stable service.

According to one aspect of the present invention, there is provided a coordinated transmission method in a beam division multiple access environment dividing a service target region into a plurality of beam sectors through a plurality of antenna arrays having at least one of a pattern characteristic and a polarization characteristic, the method including: receiving a coordination request from a user terminal located in the service target region; and performing any one among a macro diversity operation, a coordinated silence operation, and a coordinated beamforming operation for the user terminal based on an interference level included in the coordination request.

The interference level may be determined based on an intensity of a signal received from each of a serving base station and at least one peripheral base station that is causing interference in the user terminal.

The performing may perform the macro diversity operation for the user terminal when the interference level is a first level, perform the coordinated beamforming operation for the user terminal when the interference level is a second level and a backhaul capacity is great, and perform the coordinated silence operation for the user terminal when the interference level is the second level and an available base station capacity is great.

The coordinated transmission method may further include transmitting a macro diversity coordination request for the macro diversity operation to at least one peripheral base station causing interference in the user terminal by a serving base station when the macro diversity operation for the user terminal is determined to be performed, wherein the macro diversity coordination request includes at least one among information on the user terminal, data information to be received by the user terminal, resource information of the macro diversity operation to be performed, information on a beam sector in which the interference of the at least one peripheral base station is great, and information on an antenna array in which the interference of the at least one peripheral base station is great.

The serving base station and the at least one peripheral base station may perform the macro diversity operation for the user terminal using the same time/frequency resource.

The coordinated transmission method may further include transmitting a silence coordination request for the coordinated silence operation to at least one peripheral base station causing interference in the user terminal by the serving base station when the coordinated silence operation for the user terminal is determined to be performed, wherein the silence coordination request includes at least one among resource information of the coordinated silence operation to be performed, information on a beam sector in which the interference of the at least one peripheral base station is great, and information on an antenna array in which the interference of the at least one peripheral base station is great.

The at least one peripheral base station may suspend a service through an antenna array corresponding to a beam sector causing the interference in the user terminal.

The coordinated transmission method may further include transmitting a beamforming coordination request for the coordinated beamforming operation to at least one peripheral base station causing interference in the user terminal by the serving base station when the coordinated beamforming operation for the user terminal is determined to be performed, wherein the beamforming coordination request includes at least one among information on the user terminal, channel information of the user terminal, data information to be received by the user terminal, resource information of the coordinated beamforming operation to be performed, information on a beam sector in which the interference of the at least one peripheral base station is great, and information on an antenna array in which the interference of the at least one peripheral base station is great.

The serving base station and the at least one peripheral base station may perform multiple input multiple output (MIMO) transmission for the user terminal by cooperating with each other.

The coordinated transmission method may further include requesting the channel information from the user terminal.

According to one aspect of the present invention, there is provided a serving base station for coordinated transmission in a beam division multiple access environment, including: a plurality of antenna arrays having at least one of a pattern characteristic and a polarization characteristic; and a controller configured to divide a service target region into a plurality of beam sectors through the plurality of antenna arrays and perform any one among a macro diversity operation, a coordinated silence operation, and a coordinated beamforming operation for a user terminal based on an interference level included in a coordination request of the user terminal located in the service target region.

The interference level may be determined based on an intensity of a signal received from each of the serving base station and at least one peripheral base station that is causing interference in the user terminal.

The controller may determine to perform the macro diversity operation for the user terminal when the interference level is a first level, to perform the coordinated beamforming operation for the user terminal when the interference level is a second level and a backhaul capacity is great, and to perform the coordinated silence operation for the user terminal when the interference level is the second level and an available base station capacity is great.

The controller may transmit a macro diversity coordination request for the macro diversity operation to at least one peripheral base station causing interference in the user terminal when the macro diversity operation for the user terminal is determined to be performed, wherein the macro diversity coordination request includes at least one among information on the user terminal, data information to be received by the user terminal, resource information of the macro diversity operation to be performed, information on a beam sector in which the interference of the at least one peripheral base station is great, and information on an antenna array in which the interference of the at least one peripheral base station is great.

The serving base station and the at least one peripheral base station may perform the macro diversity operation for the user terminal using the same time/frequency resource.

The controller may transmit a silence coordination request for the coordinated silence operation to at least one peripheral base station causing interference in the user terminal when the coordinated silence operation for the user terminal is determined to be performed, wherein the silence coordination request includes at least one among resource information of the coordinated silence operation to be performed, information on a beam sector in which the interference of the at least one peripheral base station is great, and information on an antenna array in which the interference of the at least one peripheral base station is great.

The at least one peripheral base station may suspend a service through an antenna array corresponding to a beam sector causing the interference in the user terminal.

The controller may transmit a beamforming coordination request for the coordinated beamforming operation to at least one peripheral base station causing interference in the user terminal when the coordinated beamforming operation for the user terminal is determined to be performed, wherein the beamforming coordination request includes at least one among information on the user terminal, channel information of the user terminal, data information to be received by the user terminal, resource information of the coordinated beamforming operation to be performed, information on a beam sector in which the interference of the at least one peripheral base station is great, and information on an antenna array in which the interference of the at least one peripheral base station is great.

The serving base station and the at least one peripheral base station may perform MIMO transmission for the user terminal by cooperating with each other.

The controller may request the channel information from the user terminal.

BEST MODES OF THE INVENTION

Figure 1:
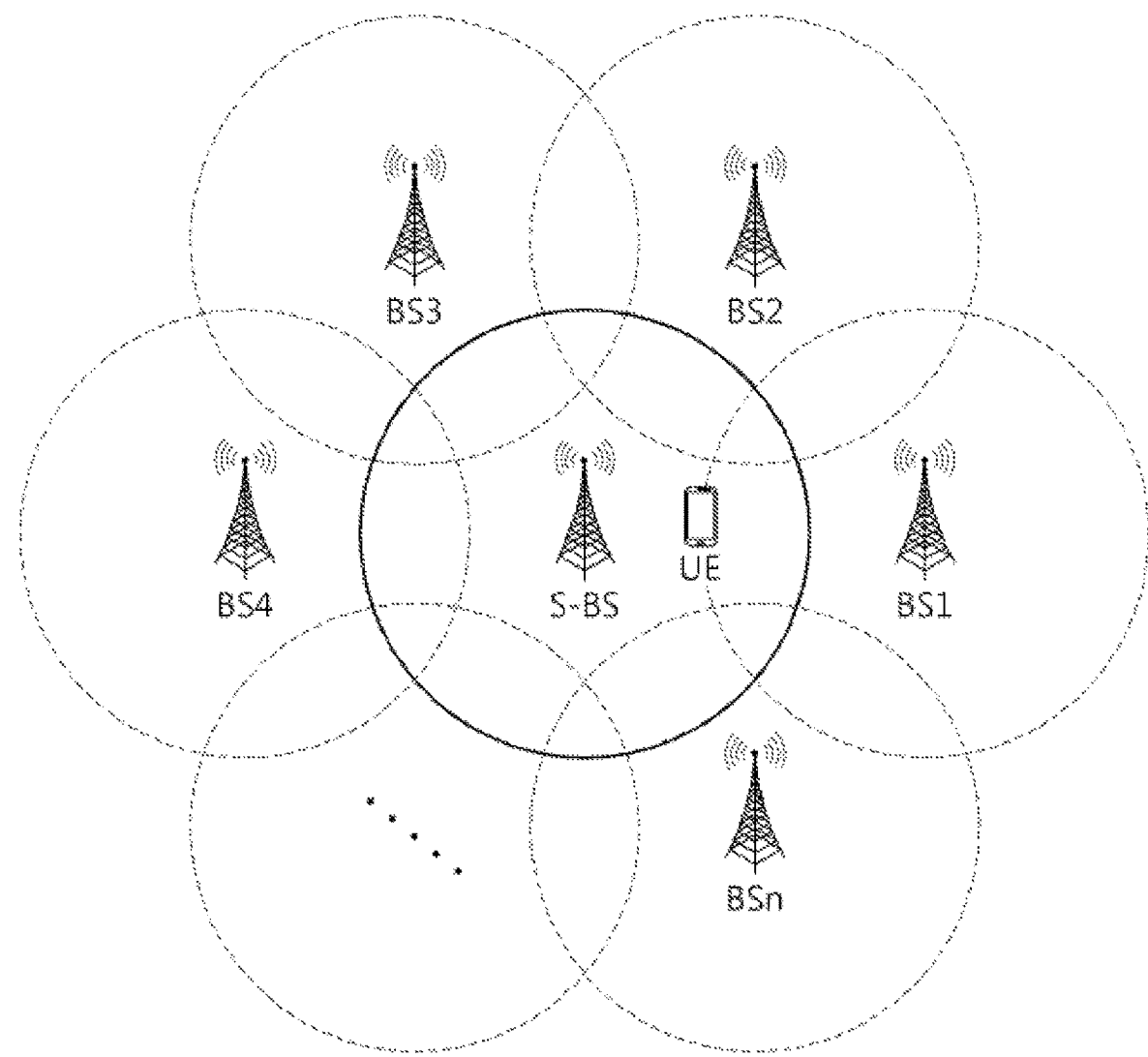
FIG. 1 is a schematic diagram of a communication system according to an embodiment of the present invention.

Since specific structural or functional descriptions related to embodiments according to the concept of the present invention disclosed herein are merely for explaining the embodiments according to the concept of the present invention, embodiments according to the concept of the present invention should be understood as being implemented in various forms and not as being limited by the embodiments described in the specification.

Embodiments according to the concept of the present invention are variously changeable and have various forms, and the embodiments are illustrated in the accompanying drawings and will be described in detail. However, the technology which will be described hereinafter should be understood as not being limited by the specific embodiments and as including all changes, equivalents, alternatives included in the technical spirit and scope of the present invention.

Although the terms "first," "second," etc. may be used herein in order to describe various elements, the corresponding elements are not limited by the terms. The terms are merely used in order to differentiate one element from another element, and for example, a first element could be termed a second element, and a second element could similarly be termed a first element without departing from the scope of the technology which will be described hereinafter.

Meanwhile, it should be understood that when an element is referred to as being "connected" or "coupled" to another element, the element may be directly connected or coupled to the other element or intervening elements may be present. In contrast, when an element is referred to as being "directly connected" or "directly coupled" to another element, there are no intervening elements. Other words used to describe relationships between elements, that is, "between" versus "directly between," "adjacent" versus "directly adjacent," etc., should be interpreted in a like fashion.

The terminology used herein to describe embodiments of the invention is not intended to limit the scope of the invention. Unless otherwise defined, the use of the singular form in the present document does not preclude the plural form. It should also be understood that the terms "comprises," "comprising," "includes," and/or "including" specify the presence of stated features, items, steps, operations, elements, and/or components when used herein, but do not preclude the presence or addition of one or more other features, items, steps, operations, elements, components, and/or groups thereof.

All terms including technical and scientific terms used herein are to be interpreted as is customary in the art to which this invention belongs unless otherwise defined. Terms in common usage which are defined in dictionaries should be understood as also being interpreted as is customary in the relevant art and not as being interpreted in an idealized or overly formal sense unless expressly so defined herein.

Hereinafter, embodiments of the present invention will be described in detail with reference to the accompanying drawings. However, the scope of the present invention is not limited or restricted by the embodiments. In the accompanying drawings, like reference numerals refer to like components.

FIG. 1 is a schematic diagram of a communication system according to an embodiment of the present invention.

Referring to FIG. 1, a communication system 10 may include a serving base station S-BS, and a plurality of peripheral base stations BS1 to BSn.

The communication system 10 may perform communication in a wireless communication environment. For example the communication system 10 may be implemented in third generation partnership project (3GPP), long-term evolution (LTE), LTE-advanced (LTE-A), 3GPP2, world interoperability for microwave access (WiMAX), etc.

Each of the serving base station S-BS and the plurality of peripheral base stations BS1 to BSn may be referred to as mobile station, a fixed station, a Node-B, an eNode-B, a base transceiver system (BTS), an access point, etc.

The serving base station S-BS and the plurality of peripheral base stations BS1 to BSn may generate a plurality of beam sectors in a service target region using a plurality of antenna arrays including antennas (or antenna devices) having at least one of a pattern characteristic and a polarization characteristic. That is, the serving base station S-BS and the plurality of peripheral base stations BS1 to BSn may provide a service by dividing the service target region into the plurality of beam sectors. In this case, the service target region may be a region in which each of the base stations S-BS and BS1 to BSn is serviceable (or communicable) and/or a region in which a user terminal UE is located.

Each of the serving base station S-BS and the plurality of peripheral base stations BS1 to BSn may be a communication device based on a multiple input multiple output (MIMO) antenna system.

The user terminal UE may be located in the service target region of the serving base station S-BS.

For example, the user terminal UE may be located in a region which is not a cell boundary of the serving base station S-BS. The user terminal UE may be located in the cell boundary of the serving base station S-BS. The user terminal UE may also be located in a cell boundary of at least one among the plurality of peripheral base stations BS1 to BSn.

The user terminal UE may receive a service from the serving base station S-BS and receive interference from at least one peripheral base station.

The user terminal UE may be referred to as a user equipment, a mobile terminal (MT), a wireless terminal, an access terminal (AT), a subscriber unit, a subscriber station (SS), a wireless device, a wireless communication device, a wireless transmit/receive unit (WTRU), a mobile node, or a mobile device.

The user terminal UE may be implemented as a mobile electronic device. The mobile electronic device may be implemented as a laptop computer, a mobile phone, a smart phone, a tablet personal computer (PC), a mobile Internet device (MID), a personal digital assistant (PDA), an enterprise digital assistant (EDA), a digital still camera, a digital video camera, a portable multimedia player (PMP), a personal (or portable) navigation device (PND), a handheld game console, an e-book, or a smart device. For example, the smart device may be implemented as a smart watch or a smart band.

The user terminal UE may receive a reception signal transmitted through each of the beam sectors generated from each of the serving base station S-BS and the plurality of peripheral base stations BS1 to BSn and measure an intensity of the reception signal. The user terminal UE may determine an interference level with respect to peripheral interference based on the measured intensity of the reception signal. The peripheral interference may include all interference occurring from the serving base station S-BS and the plurality of peripheral base stations BS1 to BSn.

Further, the user terminal UE may determine the interference level using a channel gain, a rank value, a condition number, or the like of a channel information matrix with respect to channel information.

The user terminal UE may request coordination with respect to a coordinated transmission to the serving base station S-BS according to the interference level. For example, the coordination request may refer to at least one among information of at least one peripheral base station causing interference among the plurality of peripheral base stations BS1 to BSn, beam sector information in which the interference of at least one peripheral base station is great, antenna array information in which the interference of at least one peripheral base station is great, and the interference level. The at least one peripheral base station may refer to a base station in which the interference is great.

The serving base station S-BS may perform a coordinated transmission to the user terminal UE located in the cell boundary in a beam division multiple access environment.

The serving base station S-BS may perform any one among a macro diversity operation, a coordinated silence operation, and a coordinated beamforming operation for the user terminal UE based on the interference level included in the coordination request of the user terminal UE.

In this case, the serving base station S-BS may request coordination on any one operation to at least one peripheral base station causing the interference in the user terminal UE among the plurality of peripheral base stations BS1 to BSn. The at least one peripheral base station may mitigate the interference in the user terminal UE by cooperating with the serving base station S-BS according to the coordination request with respect to the any one operation.

Hereinafter, each of coordinated transmission methods for mitigating interference in the user terminal UE located in the service target region of the serving base station S-BS will be described in detail with reference to FIGS. 2 to 7. In this case, for convenience of explanation, BS1 is assumed to be the peripheral base station causing (the greatest) interference in the user terminal UE located in the service target region of the serving base station S-BS.

Figure 2:
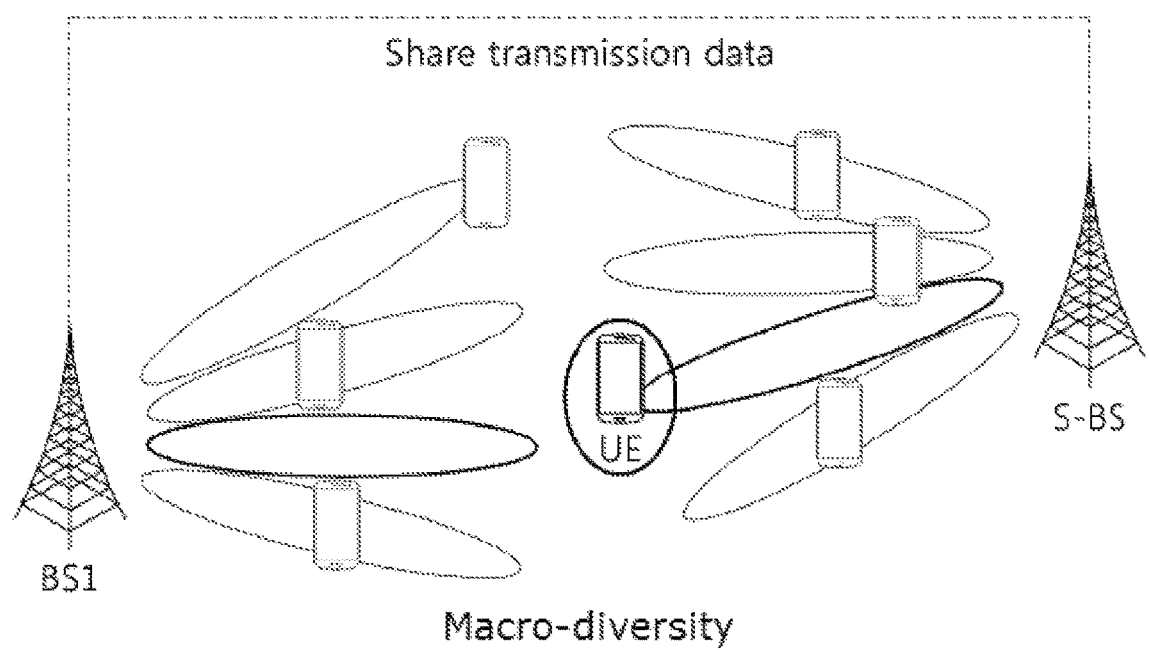
FIG. 2 is a conceptual diagram for describing one example of a coordinated transmission method according to an embodiment of the present invention.
Figure 3:
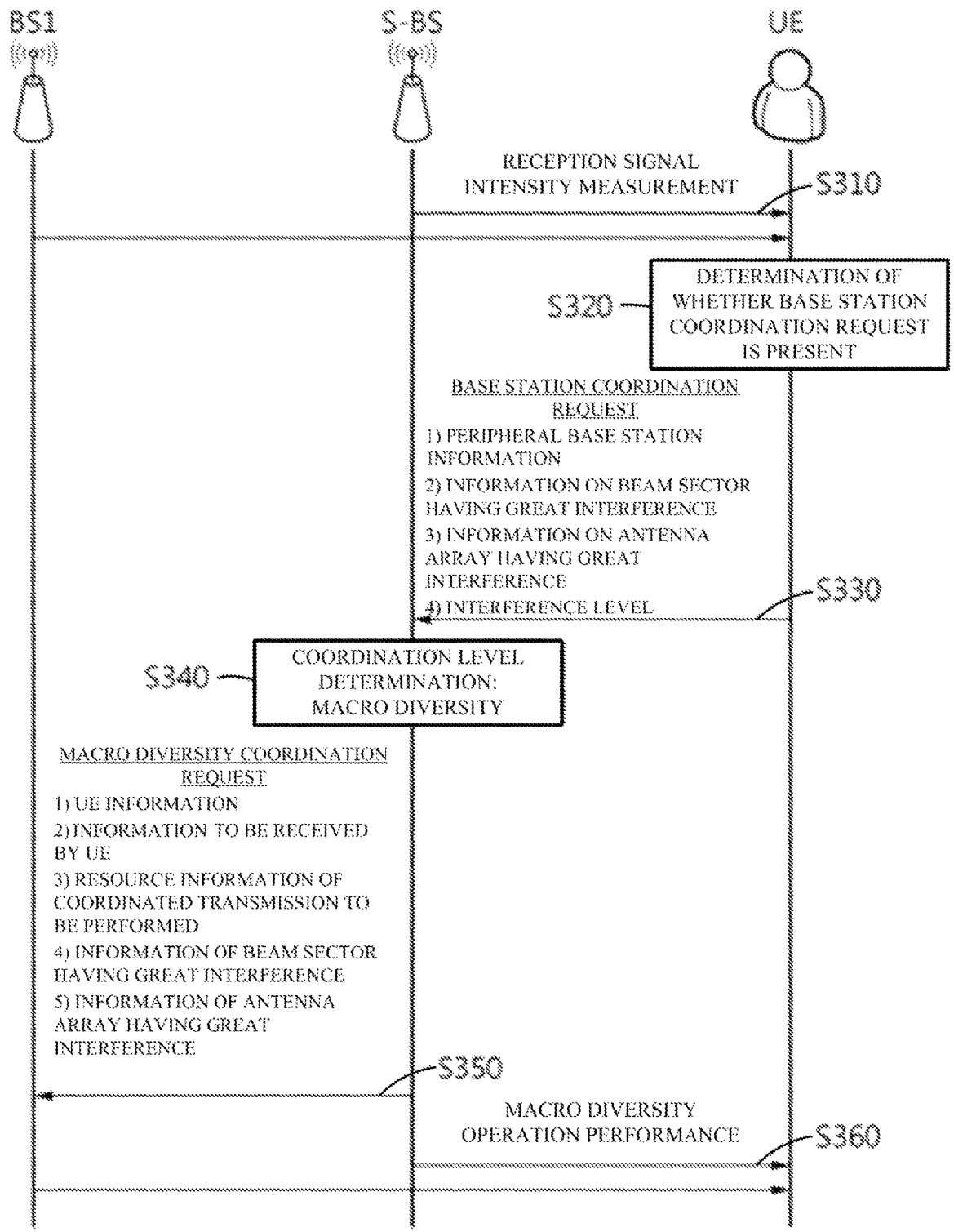
FIG. 3 is a data flowchart according to the example of the coordinated transmission method shown in FIG. 2.

FIG. 2 is a conceptual diagram for describing one example of a coordinated transmission method according to an embodiment of the present invention, and FIG. 3 is a data flowchart according to the example of the coordinated transmission method shown in FIG. 2.

Referring to FIGS. 2 and 3, the user terminal UE may receive a reception signal transmitted through each beam sector generated by the serving base station S-BS and the peripheral base station BS1 and measure an intensity of the reception signal (S310).

The user terminal UE may determine whether a base station coordination request from the serving base station S-BS is present based on the intensity of the measured reception signal (S320). For example, the user terminal UE may determine an interference level based on the intensity of the measured reception signal. In this case, the user terminal UE may determine the interference level is a first level when intensities of every reception signal received from the serving base station S-BS and the peripheral base station BS1 are determined to be small.

The user terminal UE may request that the serving base station S-BS coordinate on a coordinated transmission (S330). For example, the coordination request may include any one among information of the peripheral base station BS1, information on a beam sector in which interference of the peripheral base station BS1 is great, information on an antenna array in which the interference of the peripheral base station BS1 is great, and the interference level.

The serving base station S-BS may determine a coordinated transmission level based on the interference level (S340). For example, the serving base station S-BS may determine to perform a macro diversity operation for the user terminal UE according to the interference level which is the first level.

The serving base station S-BS may transmit a macro diversity coordination request for the macro diversity operation to the peripheral base station BS1 (S350). For example, the macro diversity coordination request may include at least one among information on the user terminal UE, data information to be received by the user terminal UE, resource information of the macro diversity operation to be performed, information on a beam sector in which the interference of the peripheral base station BS1 is great, and information of an antenna array in which the interference of the peripheral base station BS1 is great.

The peripheral base station BS1 may perform the coordinated transmission for the user terminal UE by cooperating with the serving base station S-BS according to the coordination request (S360). As shown in FIG. 2, the serving base station S-BS and the peripheral base station BS1 may perform the macro diversity operation for the user terminal UE using the same time/frequency resource. In this case, antenna arrays of the serving base station S-BS and the peripheral base station BS1 may be adaptively selected by corresponding to a service quality requirement degree requested by the user terminal UE located in the service target region of the serving base station S-BS.

The user terminal UE may mitigate interference through the macro diversity operation, which is the coordinated transmission of the serving base station S-BS and the peripheral base station BS1, and also obtain a diversity gain.

Figure 4:
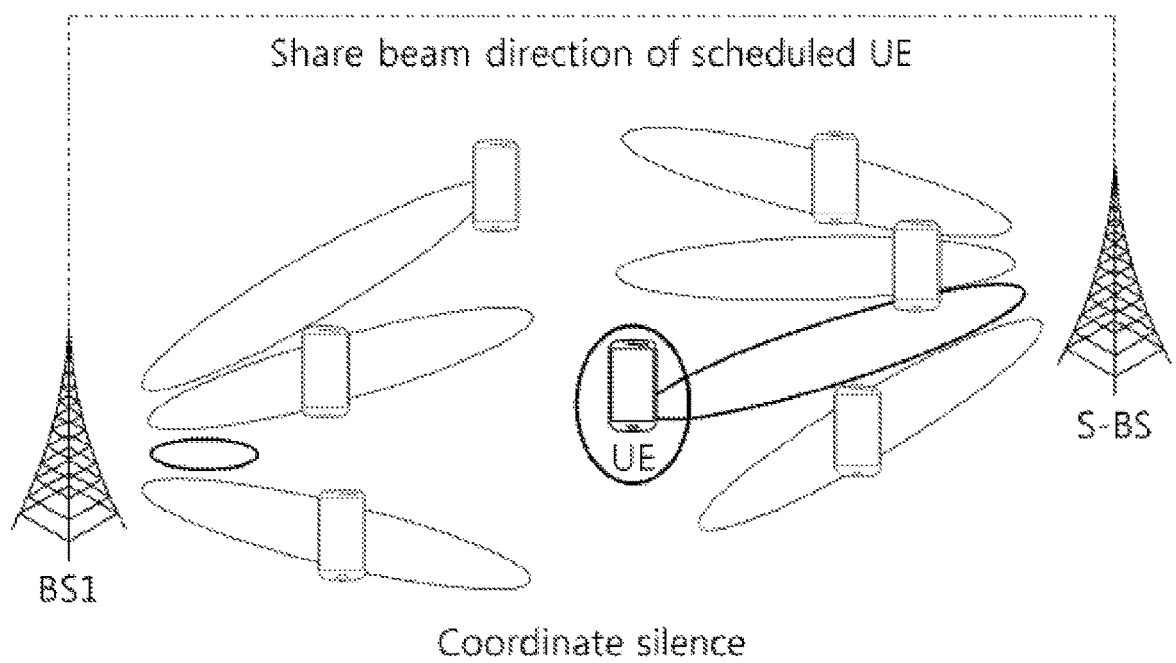
FIG. 4 is a conceptual diagram for describing another example of a coordinated transmission method according to an embodiment of the present invention.
Figure 5:
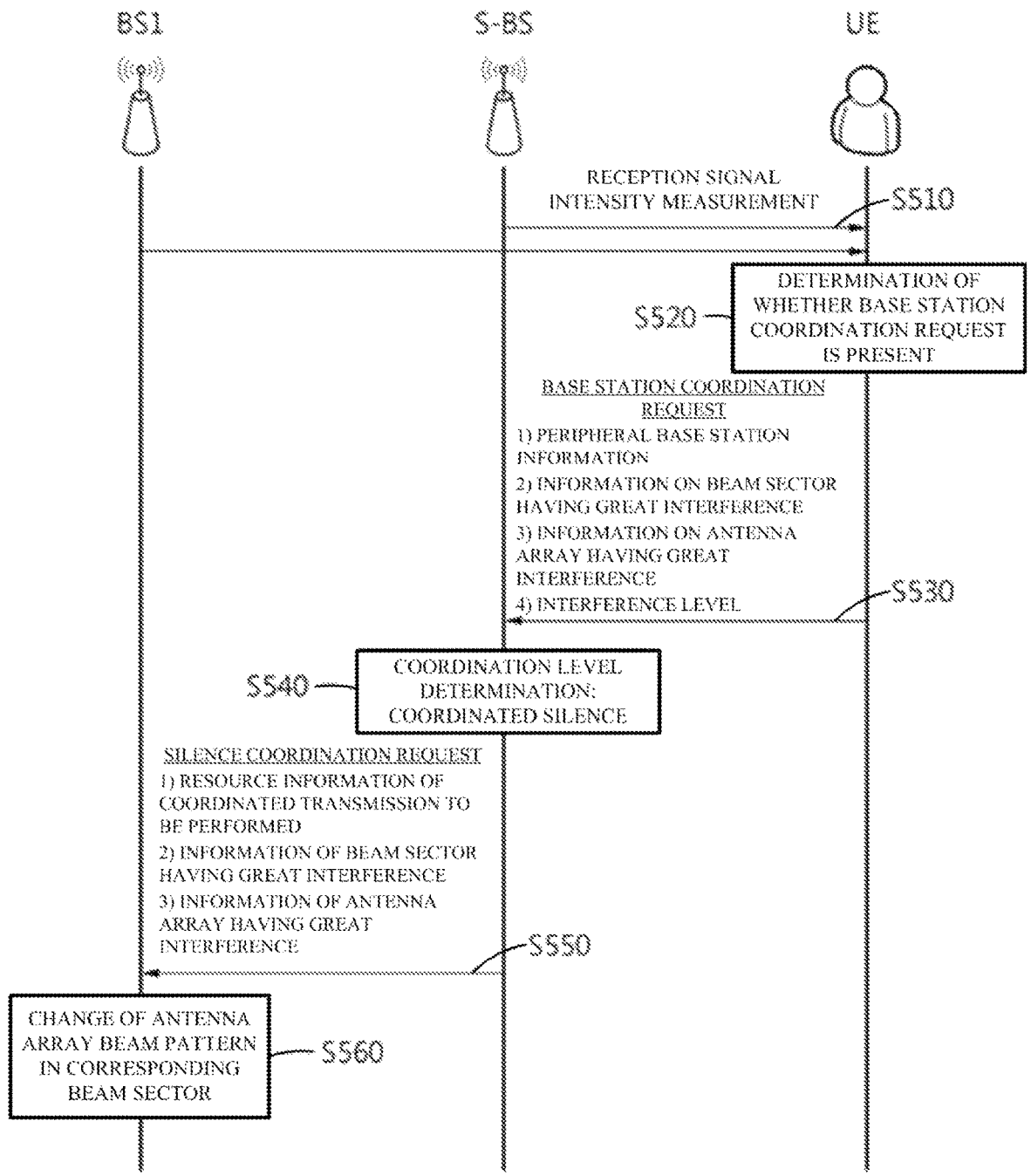
FIG. 5 is a data flowchart according to the example of the coordinated transmission method shown in FIG. 4.

FIG. 4 is a conceptual diagram for describing another example of a coordinated transmission method according to an embodiment of the present invention, and FIG. 5 is a data flowchart according to the example of the coordinated transmission method shown in FIG. 4.

Referring to FIGS. 4 and 5, the user terminal UE may receive a reception signal transmitted through each beam sector generated by the serving base station S-BS and the peripheral base station BS1 and measure an intensity of the reception signal (S510).

The user terminal UE may determine whether a base station coordination request from the serving base station S-BS is present based on the intensity of the reception signal measured (S520). For example, the user terminal UE may determine an interference level based on the intensity of the reception signal measured. In this case, the user terminal UE may determine the interference level as a second level when intensities of every reception signal received from the serving base station S-BS and the peripheral base station BS1 is determined to be great.

The user terminal UE may request that the serving base station S-BS coordinate on a coordinated transmission (S530). For example, the coordination request may include at least one among information of the peripheral base station BS1, information on a beam sector in which interference of the peripheral base station BS1 is great, information on an antenna array in which the interference of the peripheral base station BS1 is great, and the interference level.

The serving base station S-BS may determine a coordinated transmission level based on the interference level (S540). For example, when the interference level is the second level and an available base station capacity is great, the serving base station S-BS may determine to perform a coordinated silence operation for the user terminal UE.

The serving base station S-BS may transmit a silence coordination request for the coordinated silence operation to the peripheral base station BS1 (S550). For example, the silence coordination request may include at least one among resource information of the coordinated silence operation to be performed, information on a beam sector in which the interference of the peripheral base station BS1 is great, and information on an antenna array in which the interference of the peripheral base station BS1 is great.

The peripheral base station BS1 may perform the coordinated transmission for the user terminal UE by cooperating with the serving base station S-BS according to the coordination request (S560). As shown in FIG. 4, the peripheral base station BS1 may suspend a service through an antenna array corresponding to a beam sector causing interference in the user terminal UE. The antenna array may be an antenna array corresponding to the beam sector causing the greatest interference.

For example, the peripheral base station BS1 may alter beam sectors which are previously set for the coordinated silence operation (S560). That is, the peripheral base station BS1 may decrease the number of the beam sectors causing the interference in the user terminal UE.

Accordingly, the amount of interference received by the user terminal UE may be decreased due to the suspension of the service through the antenna array corresponding to the beam sector causing the interference of the peripheral base station BS1.

Figure 6:
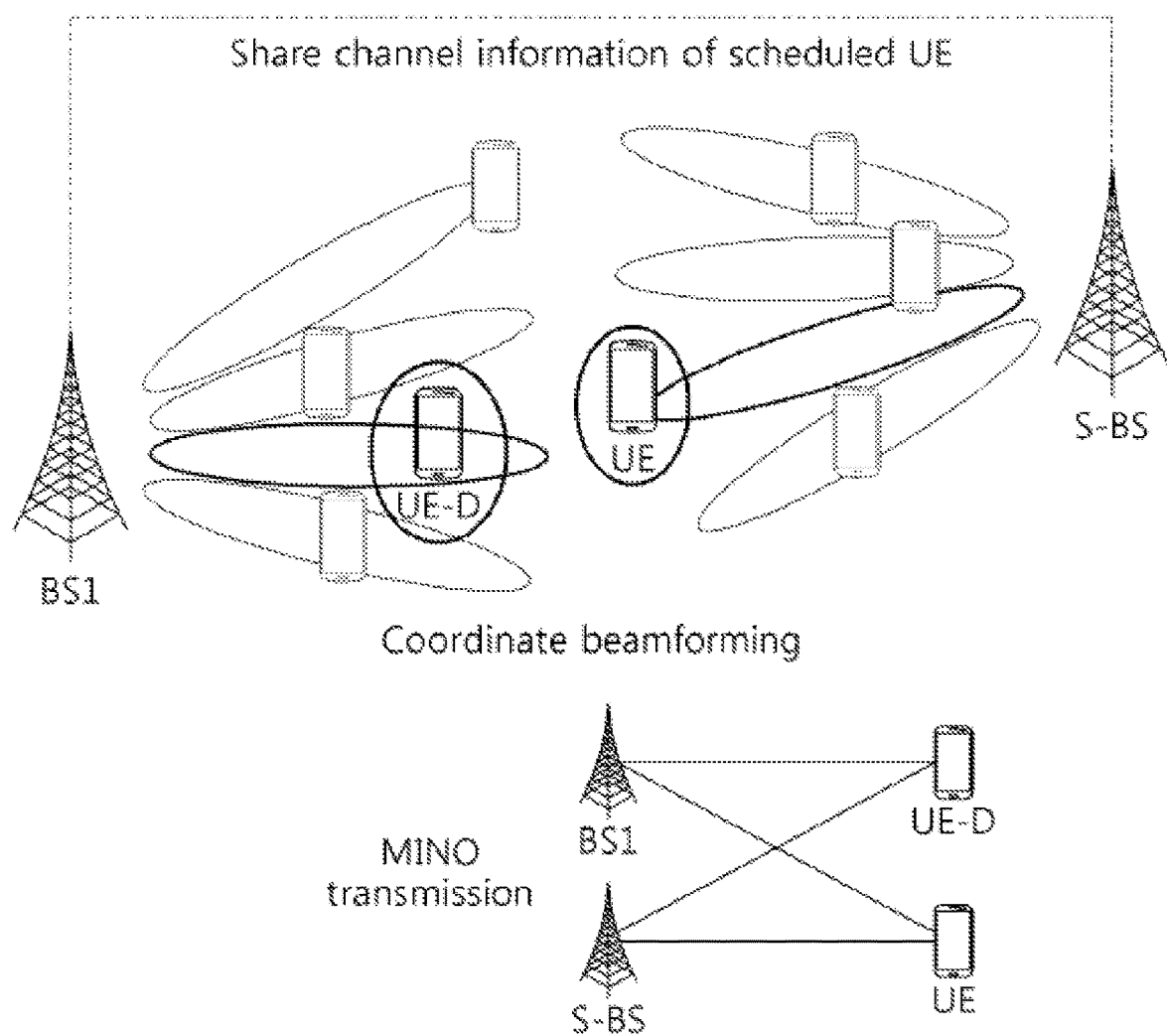
FIG. 6 is a conceptual diagram for describing still another example of a coordinated transmission method according to an embodiment of the present invention.
Figure 7:
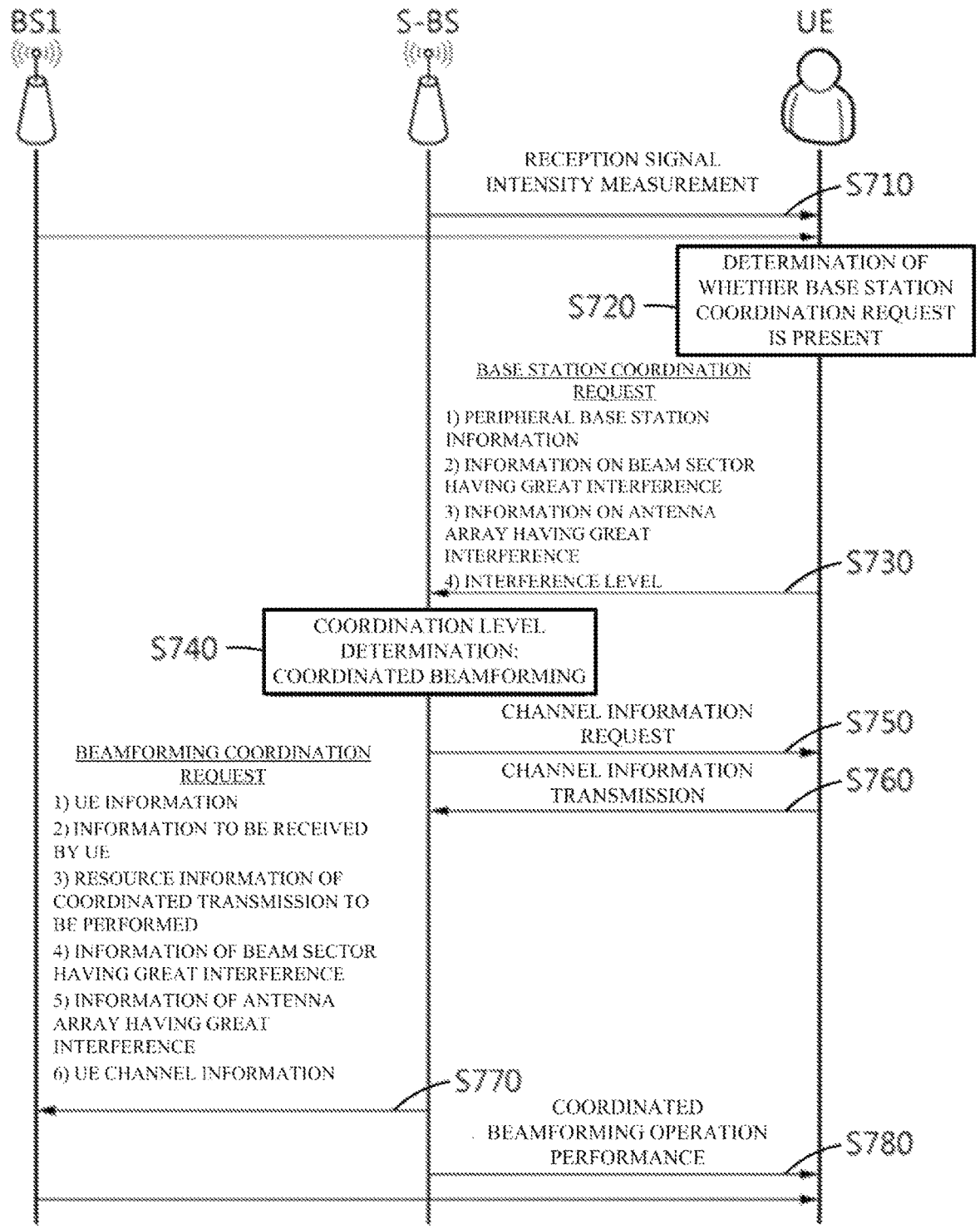
FIG. 7 is a data flowchart according to the example of the coordinated transmission method shown in FIG. 6.

FIG. 6 is a conceptual diagram for describing still another example of a coordinated transmission method according to an embodiment of the present invention, and FIG. 7 is a data flowchart according to the example of the coordinated transmission method shown in FIG. 6.

Referring to FIGS. 6 and 7, the user terminal UE may receive a reception signal transmitted through each beam sector generated by the serving base station S-BS and the peripheral base station BS1 and measure an intensity of the reception signal (S710).

The user terminal UE may determine whether a base station coordination request for the serving base station S-BS is present based on the intensity of the reception signal measured (S720). For example, the user terminal UE may determine an interference level based on the intensity of the reception signal measured.

In this case, the user terminal UE may determine the interference level as the second level when intensities of every reception signal received from the serving base station S-BS and the peripheral base station BS1 is determined to be great.

The user terminal UE may request that the serving base station S-BS coordinate on a coordinated transmission (S730). For example, the coordination request may include at least one among information of the peripheral base station BS1, information on a beam sector in which interference of the peripheral base station BS1 is great, information of an antenna array in which the interference of the peripheral base station BS1 is great, and the interference level.

The serving base station S-BS may determine a coordinated transmission level based on the interference level (S740). For example, when the interference level is the second level and a backhaul capacity is great, the serving base station S-BS may determine to perform a coordinated beamforming operation for the user terminal UE.

When the coordinated beamforming operation for the user terminal UE is determined to be performed, the serving base station S-BS may request channel information from the user terminal UE (S750). For example, the channel information may be information on a channel of the peripheral base station BS1 causing the interference.

The serving base station S-BS may receive the channel information from the user terminal UE (S760), and the serving base station S-BS may transmit a beamforming coordination request for the coordinated beamforming operation to the peripheral base station BS1 (S770). For example, the beamforming coordination request may include at least one among information on the user terminal UE, channel information of the user terminal UE, data information to be received by the user terminal UE, resource information of the coordinated beamforming operation to be performed, information of a beam sector in which the interference of the peripheral base station BS1 is great, and information on an antenna array in which the interference of the peripheral base station BS1 is great.

The peripheral base station BS1 may perform the coordinated transmission for the user terminal UE by cooperating with the serving base station S-BS according to the coordination request (S780). As shown in FIG. 6, the serving base station S-BS and the peripheral base station BS1 may perform MIMO transmission for the user terminal UE by cooperating with each other. That is, the peripheral base station BS1 may perform joint MIMO transmission for another user terminal UE-D in which a service is originally being performed and the user terminal UE in which the coordination request is present.

The user terminal UE may mitigate interference through the coordinated beamforming operation which is the coordinated transmission of the serving base station S-BS and the peripheral base station BS1. Further, since the number of antennas participating in the MIMO operation according to the coordination is doubled, a gain may be increased.

Figure 8:
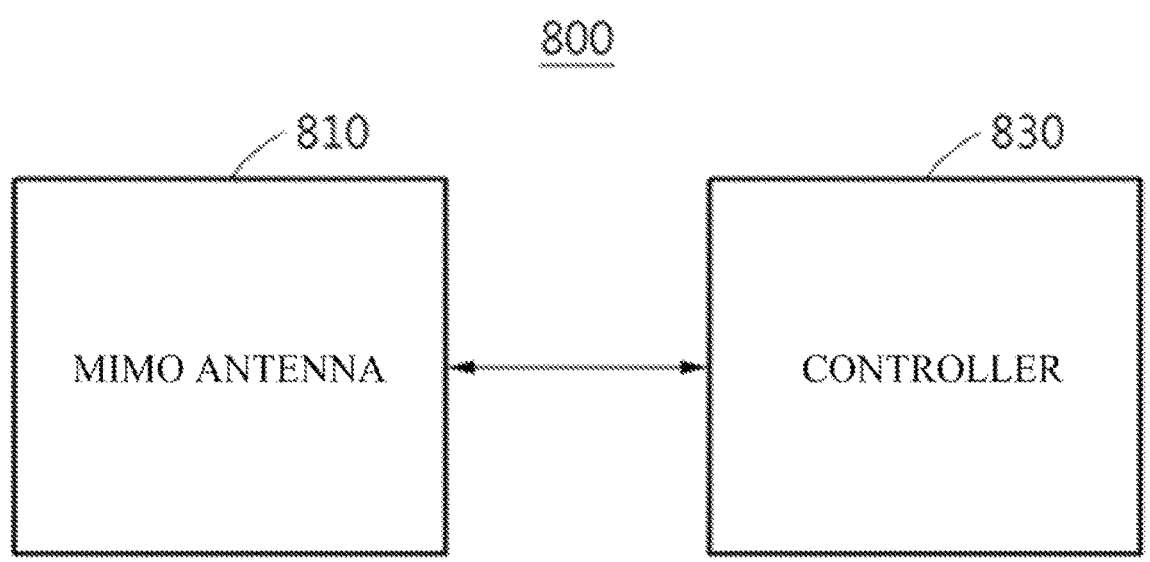
FIG. 8 is a schematic block diagram of a base station for performing a coordinated transmission method according to an embodiment of the present invention.

FIG. 8 is a schematic block diagram of a base station for performing a coordinated transmission method according to an embodiment of the present invention.

Referring to FIG. 8, a base station 800 may include a MIMO antenna 810 and a controller 830.

The MIMO antenna 810 may include a plurality of antenna arrays including antennas (or antenna devices) having at least one of a pattern characteristic and a polarization characteristic.

The controller 830 may divide a service target region of the base station 800 into a plurality of beam sectors through the plurality of antenna arrays and perform any one among a macro diversity operation, a coordinated silence operation, and a coordinated beamforming operation for a user terminal based on an interference level included in a coordination request of the user terminal located in the service target region of the base station 800.

The base station 800 shown in FIG. 8 may be substantially the same as the serving base station S-BS and the plurality of peripheral base stations BS1 to BSn shown in FIG. 1.

Since the description described with reference to FIGS. 1 to 7 is applied to the base station 800 shown in FIG. 8 as it is, a more detailed description thereof will be omitted.

The apparatus described above may be implemented by a hardware component, a software component, and/or a combination thereof. For example, the apparatus and the components described in the embodiments of the present invention may be implemented using one or more general purpose computer or specific purpose computer such as a processor, a controller, an arithmetic logic unit (ALU), a digital signal processor, a microcomputer, a field programmable gate array (FPGA), a programmable logic unit (PLU), a microprocessor, or any other devices which are able to execute an instruction and respond to the instruction. A processing device may execute an operating system (OS) and one or more software applications performed in the OS. Further, the processing device may access, store, manipulate, process, and generate data in response to the execution of the software. For convenience of understanding, a case in which one processing device is used may be described, but those skilled in the art may understand that a plurality of processing elements and/or a processing element having a plurality of forms are included. For example, the processing device may include one controller and a plurality of processors or one processor. Further, other processing configuration such as a parallel processor may be possible.

The software may include a computer program, a code, an instruction, or one or more combinations thereof and configure the processing device to be operated as desired, or independently or collectively instruct the processing device. In order to be interpreted by the processing device or provide the instruction or the data to the processing device, the software and/or data may be permanently or temporarily embodied in any type of machine, a component, a physical device, a virtual equipment, a computer storage medium or device, or a transmitted signal wave.

The software may be distributed on a computer system connected through a network and be stored or executed in a distributed method. The software and the data may be stored in one or more computer readable recording media.

The method according to an embodiment of the present invention may be recorded in a computer readable medium by being implemented in the form of a program instruction which is executable using various computer means. The computer readable medium may include a program instruction, a data file, a data structure, or the like alone or in combination. The program instruction recorded in the medium may be specially designed and configured for an embodiment of the present invention or be well known to and used by those skilled in the art of computer software. Examples of the computer readable recording medium may include a hardware device which is specially configured to store and perform the program instruction such as a hard disk, a magnetic media such as a floppy disk and a magnetic tape, an optical media such as a compact disk-read only memory (CD-ROM) and a digital versatile disk (DVD), and a magneto-optical media such as a floptical disk, a read only memory (ROM), a random access memory (RAM), a flash memory, etc. Examples of the program instruction may include a machine language code which is made by a compiler, and may also include a high-level language code which is executable by a computer using an interpreter or the like. The hardware device may be configured to operate as one or more software modules in order to perform the operation of an embodiment of the present invention and vice versa.

While embodiments described hereinbefore are described with reference to limited embodiments and drawings, those of ordinary skill in the art may understand that various changes and modifications of the above-described embodiments are possible. For example, a proper result may be achieved even when the above-described embodiments may be performed in a sequence different from the method described above, and/or the components such as the above-described system, configurations, apparatuses, circuits and the like are coupled or combined in a form different from the method described above, or are replaced or substituted by other components or their equivalents.

Therefore, other implementations, other embodiments, and equivalents to the claims may also be included in the scope of the following claims.

The invention claimed is:

1. A coordinated transmission method in a service target region with at least two base stations comprising a serving base station and a peripheral base station, the method comprising:
receiving a coordination request from a user terminal located in the service target region; and
performing a macro diversity operation for the user terminal if intensities of reception signals from the serving base station and the peripheral base station to the user terminal are lower than a reference value,
performing a coordinated silence operation for the user terminal if the intensities of the reception signals from the serving base station and the peripheral base station to the user terminal are higher than the reference value, and a backhaul capacity is greater than a predetermined capacity, and
performing a coordinated beamforming operation for the user terminal if the intensities of the reception signals from the serving base station and the peripheral base station to the user terminal are higher than the reference value, and an available base station capacity is greater than a predetermined capacity,
wherein the at least two base stations provide a plurality of beam sectors to the service target region with a beam division multiple access to the user terminal,
wherein the base station includes a plurality of antenna arrays which include antenna elements having at least one of a pattern characteristic and a polarization characteristic.

2. The coordinated transmission method of claim 1, wherein the intensifies of the reception signal from the serving base station and the peripheral base station that is causing interference in the user terminal determines an interference level.

3. The coordinated transmission method of claim 1, further comprising:
transmitting a macro diversity coordination request for the macro diversity operation to at least one peripheral base station causing interference in the user terminal by a serving base station when the macro diversity operation for the user terminal is determined to be performed,
wherein the macro diversity coordination request includes at least one among information on the user terminal, data information to be received by the user terminal, resource information of the macro diversity operation to be performed, information on a beam sector in which the interference of the at least one peripheral base station is great, and information on an antenna array in which the interference of the at least one peripheral base station is great.

4. The coordinated transmission method of claim 3, wherein the serving base station and the at least one peripheral base station perform the macro diversity operation for the user terminal using a same time/frequency resource.

5. The coordinated transmission method of claim 2, further comprising:
transmitting a silence coordination request for the coordinated silence operation to at least one peripheral base station causing interference in the user terminal by the serving base station when the coordinated silence operation for the user terminal is determined to be performed,
wherein the silence coordination request includes at least one among resource information of the coordinated silence operation to be performed, information on a beam sector in which the interference of the at least one peripheral base station is great, and information on an antenna array in which the interference of the at least one peripheral base station is great.

6. The coordinated transmission method of claim 5, wherein the at least one peripheral base station suspends a service through an antenna array corresponding to a beam sector causing the interference in the user terminal.

7. The coordinated transmission method of claim 2, further comprising:
transmitting a beamforming coordination request for the coordinated beamforming operation to at least one peripheral base station causing interference in the user terminal by the serving base station when the coordinated beamforming operation for the user terminal is determined to be performed, wherein the beamforming coordination request includes at least one among information on the user terminal, channel information of the user terminal, data information to be received by the user terminal, resource information of the coordinated beamforming operation to be performed, information of a beam sector in which the interference of the at least one peripheral base station is great, and information of an antenna array in which the interference of the at least one peripheral base station is great.

8. The coordinated transmission method of claim 7, wherein the serving base station and the at least one peripheral base station perform multiple input multiple output (MIMO) transmission for the user terminal by cooperating with each other.

9. The coordinated transmission method of claim 7, further comprising:

requesting the channel information from the user terminal.

10. A serving base station for coordinated transmission with at least one peripheral base station, comprising:

a plurality of antenna arrays which includes antenna elements having at least one of a pattern characteristic and a polarization characteristic; and a controller configured to divide a service target region into a plurality of beam sectors through the plurality of antenna arrays and perform any one among a macro diversity operation, a coordinated silence operation, and a coordinated beamforming operation for a user terminal based on an interference level included in a coordination request of the user terminal located in the service target region, wherein the serving base station provides the plurality of beam sectors with the at least one peripheral base station to the service target region based on a beam division multiple access, and wherein the controller determines to perform the macro diversity operation for the user terminal if intensities of reception signal from the serving base station and the peripheral base station to the user terminal are lower than a reference value, perform the coordinated beamforming operation for the user terminal if intensities of reception signal from the serving base station and the peripheral base station to the user terminal are higher than the reference value, and a backhaul capacity is greater than a predetermined capacity, and perform the coordinated silence operation for the user terminal if intensities of reception signal from the serving base station and the peripheral base station to the user terminal are higher than the reference value, and an available base station capacity is greater than a predetermined capacity.

11. The serving base station of claim 10, wherein the interference level is determined based on an intensity of a signal received from each of the serving base station and at least one peripheral base station causing interference in the user terminal.

12. The serving base station of claim 10, wherein the controller transmits a macro diversity coordination request for the macro diversity operation to at least one peripheral base station causing interference in the user terminal when the macro diversity operation for the user terminal is determined to be performed, and wherein the macro diversity coordination request includes at least one among information on the user terminal, data information to be received by the user terminal, resource information of the macro diversity operation to be performed, information on a beam sector in which the interference of the at least one peripheral base station is great, and information on an antenna array in which the interference of the at least one peripheral base station is great.

13. The serving base station of claim 12, wherein the serving base station and the at least one peripheral base station perform the macro diversity operation for the user terminal using a same time/frequency resource.

14. The serving base station of claim 10, wherein the controller transmits a silence coordination request for the coordinated silence operation to at least one peripheral base station causing interference in the user terminal when the coordinated silence operation for the user terminal is determined to be performed, wherein the silence coordination request includes at least one among resource information of the coordinated silence operation to be performed, information of a beam sector in which the interference of the at least one peripheral base station is great, and information on an antenna array in which the interference of the at least one peripheral base station is great.

15. The serving base station of claim 14, wherein the at least one peripheral base station suspends a service through an antenna array corresponding to a beam sector causing the interference in the user terminal.

16. The serving base station of claim 10, wherein the controller transmits a beamforming coordination request for the coordinated beamforming operation to at least one peripheral base station causing interference in the user terminal when the coordinated beamforming operation for the user terminal is determined to be performed, and wherein the beamforming coordination request includes at least one among information on the user terminal, channel information of the user terminal, data information to be received by the user terminal, resource information of the coordinated beamforming operation to be performed, information on a beam sector in which the interference of the at least one peripheral base station is great, and information on an antenna array in which the interference of the at least one peripheral base station is great.

17. The serving base station of claim 16, wherein the serving base station and the at least one peripheral base station perform multiple input multiple output (MIMO) transmission for the user terminal by cooperating with each other.

18. The serving base station of claim 16, wherein the controller requests the channel information from the user terminal.

* * * * *